United States Patent
Li

(10) Patent No.: US 11,387,890 B2
(45) Date of Patent: Jul. 12, 2022

(54) METHOD AND APPARATUS FOR DC OFFSET DEGRADATION

(71) Applicant: Telefonaktiebolaget LM Ericsson (publ), Stockholm (SE)

(72) Inventor: Ming Li, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 2 days.

(21) Appl. No.: 16/642,444

(22) PCT Filed: Sep. 26, 2017

(86) PCT No.: PCT/CN2017/103314
§ 371 (c)(1),
(2) Date: Feb. 27, 2020

(87) PCT Pub. No.: WO2019/061007
PCT Pub. Date: Apr. 4, 2019

(65) Prior Publication Data
US 2020/0259548 A1    Aug. 13, 2020

(51) Int. Cl.
*H04B 7/08* (2006.01)
*H04B 1/30* (2006.01)

(52) U.S. Cl.
CPC .......... *H04B 7/08* (2013.01); *H04B 1/30* (2013.01)

(58) Field of Classification Search
CPC ..... H04L 25/061; H04L 25/06; H04L 25/063; H04L 27/3863; H04B 1/30
USPC ......................................................... 375/319
See application file for complete search history.

(56) References Cited

U.S. PATENT DOCUMENTS

| 8,331,424 B2 * | 12/2012 | Razzell ............... H04B 1/7183 375/219 |
| 9,325,958 B2 * | 4/2016 | Blayney .................. H04N 5/76 |
| 2003/0002604 A1 | 1/2003 | Fifield et al. |
| 2004/0248532 A1 * | 12/2004 | Khoini-Poorfard .... H04H 40/90 455/132 |

(Continued)

FOREIGN PATENT DOCUMENTS

| CN | 1520650 A | 8/2004 |
| WO | 2017157471 A1 | 9/2017 |

OTHER PUBLICATIONS

International Search Report and Written Opinion of the International Searching Authority for PCT International Application No. PCT/CN2017/103314 dated Apr. 27, 2018, 9 pages.

(Continued)

*Primary Examiner* — Sam K Ahn
*Assistant Examiner* — Gina M McKie
(74) *Attorney, Agent, or Firm* — Sage Patent Group

(57) ABSTRACT

Embodiments of the present disclosure provide a method, apparatus and computer program products for DC offset degradation. A method implemented in a massive multi-input multi-output (MIMO) system, which comprises a plurality of receiver branches, includes receiving a radio frequency (RF) signal in the plurality of receive branches. The method further includes configuring different local frequencies of a plurality of local oscillators respectively in the plurality of receiver branches according to a carrier frequency of the RF signal, to enable direct current (DC) offsets in the plurality of receiver branches to be distinguishable from each other in frequency.

18 Claims, 12 Drawing Sheets

(56) References Cited

U.S. PATENT DOCUMENTS

| | | |
|---|---|---|
| 2005/0111525 A1 | 5/2005 | Driesen et al. |
| 2009/0143031 A1* | 6/2009 | Shah ........................ H04B 1/28 |
| | | 455/114.1 |
| 2010/0246378 A1 | 9/2010 | Vujcic et al. |
| 2012/0044004 A1* | 2/2012 | Payne ..................... H03M 1/08 |
| | | 327/161 |
| 2015/0171890 A1* | 6/2015 | Pagnanelli .......... H03M 1/0836 |
| | | 341/143 |

OTHER PUBLICATIONS

European Search Report for European Patent Application No. 17927401.4 dated Apr. 6, 2021.

* cited by examiner

METHOD AND APPARATUS FOR DC OFFSET DEGRADATION

CROSS REFERENCE TO RELATED APPLICATION

This application is a 35 U.S.C. § 371 national stage application of PCT International Application No. PCT/CN2017/103314, filed on Sep. 26, 2017, the disclosure and content of which is incorporated herein by reference in its entirety.

TECHNICAL FIELD

The non-limiting and exemplary embodiments of the present disclosure generally relate to the technical field of wireless communications, and specifically to a method, apparatus and computer program for direct current (DC) offset degradation.

BACKGROUND

This section introduces aspects that may facilitate a better understanding of the disclosure. Accordingly, the statements of this section are to be read in this light and are not to be understood as admissions about what is in the prior art or what is not in the prior art.

Zero-IF receiver is a kind of homodyne receiver that down-converts a radio frequency (RF) signal received by an antenna directly into a baseband (BF) signal. FIG. 1 shows a schematic structure of the zero-IF receiver. In FIG. 1, the local oscillator may generate a local oscillation signal of which a local frequency is same as a frequency of the RF signal. The received RF signal may be mixed with the local oscillation signal to obtain I, Q signals. The I, Q signals are then filtered and converted into digital I, Q signals for further processing.

However in the zero-IF receiver, DC offset may be caused due to self-mixing of the local oscillator. FIG. 2 shows an illustration of generate DC offset in the zero-IF receiver. As shown in FIG. 2, the local oscillation signal of the local oscillator may be transmitted to the mixer via the amplifier and the RF filter 2, and then may be mixed with the local oscillation signal directly from the local oscillator to generate the DC offset. Meanwhile, the DC offset may change due to gain change, temperature change, or blocker on/off.

To demonstrate impact of the DC offset to the received signal, FIG. 3 shows the DC offset position normally in a uplink SC-FDMA (Single Carrier Frequency Division Multiple Access) signal of LTE (Long Term Evolution) network, for example. As shown in FIG. 3, the DC offset is at the middle of carrier bandwidth of the signal, but has 7.5 kHz offset from a center of a certain subcarrier. In fact, the DC offset is at the middle of certain 2 subcarriers.

When the zero-IF receiver down converts the RF signal into the BF signal, the DC offset may be added to the BF signal, resulting in signal degradation. Moreover the DC offset may affect the subsequent demodulation operation, e.g. FFT (Fast Fourier Transform) operation. When the DC offset is not equal to subcarriers frequency points, e.g. FFT bins, each sample for the FFT will be impacted.

FIG. 4 demonstrates an example of the DC offset in frequency domain Assume that a subcarrier spacing is 15 kHz and there are 1000 subcarriers (i.e. FFT bins). It can be assumed that DC energy is same as the desired signal power. The worst DC offset case will occur when the local oscillator is placed in-between the FFT grid exactly, as shown in FIG. 3. Many FFT bins will have bad SNR (Signal to Noise Ratio). The result is that sensitivity degrades seriously.

In order to eliminate or correct the DC offset, it has been proposed to use a high pass (HP) filter to filter the DC offset from the BF signal. This mechanism is very simple, which includes a FIR filter in time domain to generate a very sharp filtering try to erase the DC offset. However this mechanism needs to monitor the DC offset to generate coefficients of the FIR filter.

Massive multiple-input multiple-output (MIMO) is one of key technologies in the LTE network. Massive MIMO makes use of a very large number of antennas that are operated fully coherently and adaptively at transmitter side and receiver side respectively to improve communication quality. Extra antennas help by focusing transmission and reception of signal energy in ever-smaller regions of space. This brings huge improvements in communication throughput and energy efficiency, in particularly when combined with simultaneous scheduling of a large number of user terminals, e.g., tens or hundreds. Massive MIMO was originally envisioned for time division duplex (TDD) operation, but can also be potentially applied in frequency division duplex (TDD) operation.

Other benefits of massive MIMO may include extensive use of inexpensive low-power components, reduced latency, simplification of media access control (MAC) layer, and robustness to interference and intentional jamming. The anticipated throughput may depend on propagation environment providing asymptotically orthogonal channels to the terminals.

Active antenna system (AAS) is a new type of base station which may employ massive MIMO technology. The AAS may comprise a plurality of transmitter/receiver branches. When each of the receiver branches comprises the zero-IF receiver, the DC offset would be generated in all receiver branches. Due to superposition of the DC offsets among all receiver branches, the impact of the DC offset to the signal will be worse.

Therefore it is desired to provide a mechanism for mitigating impact of the DC offset in a massive MIMO system such as the AAS.

SUMMARY

Various embodiments of the present disclosure mainly aim at providing a method, apparatus and computer programs for DC offset degradation implemented in a massive MIMO system. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented in a massive MIMO system, wherein the massive MIMO system comprises a plurality of receiver branches. The method may comprises receiving a radio frequency (RF) signal in the plurality of receive branches, and configuring different local frequencies of a plurality of local oscillators respectively in the plurality of receiver branches according to a carrier frequency of the RF signal, to enable DC offsets in the plurality of receiver branches to be distinguishable from each other in frequency.

In some embodiments, the different local frequencies of the plurality of local oscillators may be configured such that the DC offsets are positioned respectively at a center of different subcarriers of a carrier carrying the RF signal.

In some embodiments, the different local frequencies of the plurality of local oscillators may be configured to be different from the carrier frequency by (N+0.5) multiple of a subcarrier spacing, wherein N is a natural number.

In some embodiments, the method may further comprise: converting, in each of the receiver branches, the RF signal into an analog baseband signal by means of the corresponding local oscillator, such that the analog baseband signals in the plurality of receiver branches shift from each other in frequency by a difference between the local frequencies of the corresponding local oscillators; and converting, in each of the receiver branches, the analog baseband signal into a digital baseband signal, such that the digital baseband signals are aligned with each other in frequency.

In some embodiment, converting, in each of the receiver branches, the analog baseband signal into a digital baseband signal may comprise: performing an analog-to-digital conversion on the analog baseband signal; and mixing the converted baseband signal with a digital oscillation signal, wherein the digital oscillation signal has a frequency that is equal to a frequency difference between the local frequency of the local oscillator in the receiver branch and the carrier frequency.

In some embodiments, the method may further comprise transforming the digital baseband signals in time domain into subcarrier signals in frequency domain by means of Fast Fourier Transform (FFT); and forming a plurality of beam signals based on the subcarrier signals.

In a second aspect of the disclosure, there is provided an apparatus in a massive MIMO system, wherein the massive MIMO system comprises a plurality of receiver branches. The apparatus may comprise a processor and a memory. The memory contains instructions executable by the processor, whereby the apparatus is operative to: receive a RF signal in the plurality of receive branches, and configure different local frequencies of a plurality of local oscillators respectively in the plurality of receiver branches according to a carrier frequency of the RF signal, to enable DC offsets in the plurality of receiver branches to be distinguishable from each other in frequency.

In some embodiments, the apparatus is operative to configure the different local frequencies of the plurality of local oscillators such that the DC offsets are positioned respectively at a center of different subcarriers of a carrier carrying the RF signal.

In some embodiments, the apparatus is operative to configure the different local frequencies of the plurality of local oscillators to be different from the carrier frequency by (N+0.5) multiple of a subcarrier spacing, wherein N is a natural number.

In some embodiments, the apparatus is further operative to: convert, in each of the receiver branches, the RF signal into an analog baseband signal by means of the corresponding local oscillator, such that the analog baseband signals in the plurality of receiver branches shift from each other in frequency by a difference between the local frequencies of the corresponding local oscillators; and convert, in each of the receiver branches, the analog baseband signal into a digital baseband signal, such that the digital baseband signals are aligned with each other in frequency.

In some embodiments, the apparatus is operative to: perform, in each of the receiver branches, an analog-to-digital conversion on the analog baseband signal; and mix, in each of the receiver branches, the converted baseband signal with a digital oscillation signal, wherein the digital oscillation signal has a frequency that is equal to a frequency difference between the local frequency of the local oscillator in the receiver branch and the carrier frequency.

In some embodiments, the apparatus is further operative to: transform the digital baseband signals in time domain into subcarrier signals in frequency domain by means of FFT; and form a plurality of beam signals based on the subcarrier signals.

In a third aspect of the disclosure, there is provided a massive MIMO system. The massive MIMO system may comprise: a plurality of receiver branches, each of which comprises an antenna configured to receive a RF signal; and a processor configured to configure different local frequencies of a plurality of local oscillators respectively in the plurality of receiver branches according to a carrier frequency of the RF signal, to enable DC offsets in the plurality of receiver branches to be distinguishable from each other in frequency.

In some embodiments, the processor may be configured to configure the different local frequencies of the plurality of local oscillators such that the DC offsets are positioned respectively at a center of different subcarriers of a carrier carrying the RF signal.

In some embodiments, the processor may be configured to configure the different local frequencies of the plurality of local oscillators to be different from the carrier frequency by (N+0.5) multiple of a subcarrier spacing, wherein N is a natural number.

In some embodiments, each of the plurality of receiver branch may further comprise: a first converter configured to convert the RF signal into an analog baseband signal by means of the corresponding local oscillator, such that the analog baseband signals in the plurality of receiver branches shift from each other in frequency by a difference between the local frequencies of the corresponding local oscillators; and a second converter configured to convert the analog baseband signal into a digital baseband signal, such that the digital baseband signals are aligned with each other in frequency.

In some embodiments, the second converter may comprise: an analog-to-digital converter configured to perform an analog-to-digital conversion on the analog baseband signal; and a digital mixer configured to mix the converted baseband signal with a digital oscillation signal, wherein the digital oscillation signal has a frequency that is equal to a frequency difference between the local frequency of the local oscillator in the receiver branch and the carrier frequency.

In some embodiments, the massive MIMO system may further comprise a FFT transformer configured to transform the digital baseband signals in time domain into subcarrier signals in frequency domain by means of FFT; and a beamformer configured to form a plurality of beam signals based on the subcarrier signals.

In a fourth aspect of the disclosure, there is provided an apparatus in a massive MIMO system. The apparatus may comprise a receiving unit configured to receiving a RF signal in the plurality of receive branches, and a configuring unit configured to configuring different local frequencies of a plurality of local oscillators respectively in the plurality of receiver branches according to a carrier frequency of the RF signal, to enable DC offsets in the plurality of receiver branches to be distinguishable from each other in frequency.

In a fifth aspect of the disclosure, there is provided an apparatus in a massive MIMO system. The apparatus may comprise processing means adapted to perform any method in accordance with the first aspect of the disclosure.

In a sixth aspect of the disclosure, there is provided a computer program, comprising instructions which, when executed on at least one processor, cause the at least one processor to carry out the method according to the first aspect of the disclosure.

According to the various aspects and embodiments as mentioned above, the impact of the DC offset to the received signal can be mitigated in the massive MIMO system.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
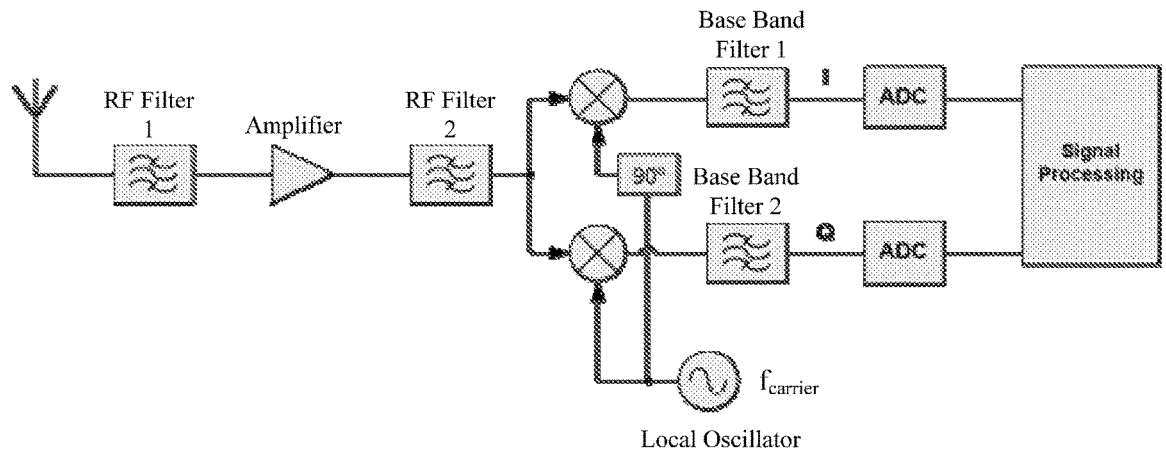
FIG. 1 illustrates a schematic structure of the conventional zero-IF receiver.
Figure 2:
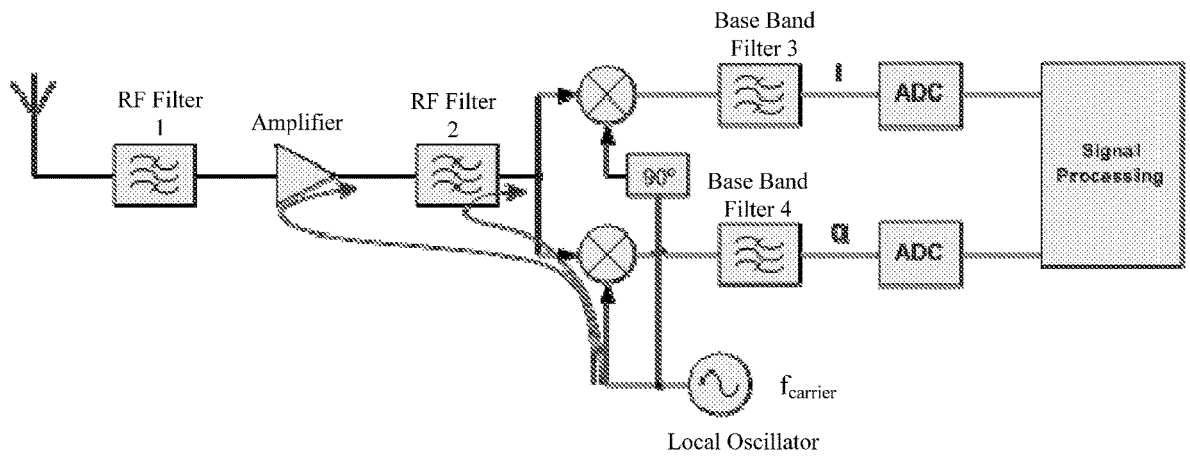
FIG. 2 is an illustration of generating DC offset in the zero-IF receiver.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

For illustrative purposes, several embodiments of the present disclosure will be described in the context of a 3GPP LTE system. Those skilled in the art will appreciate, however, that the concept and principle of the several embodiments of the present disclosure may be more generally applicable to other wireless networks, for example a third generation (3G) CDMA-based network or a future network (e.g., a 5G or New Radio (NR) system).

Figure 5:
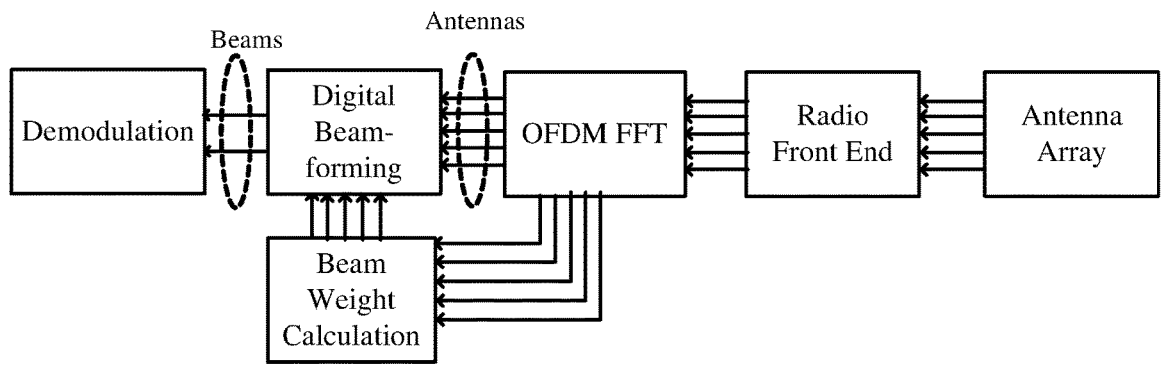
FIG. 5 is a diagram illustrating a typical receiver in the massive MIMO system.

The non-limiting and exemplary embodiments of the present disclosure relate to the DC offset degradation in the massive MIMO system. Currently, OFDM (Orthogonal Frequency Division Multiplexing) and beamforming are widely used in the massive MIMO system. FIG. 5 shows a typical receiver of the massive MIMO system.

In FIG. 5, the radio front end may be implemented as zero-IF receivers, for example. The RF signals received through the antenna array including multiple antennas may be fed into the radio front end. In the radio front end, the RF signal is filtered, amplified, and down converted directly into BF signals. Then the BF signals are converted into digital signals. Then in digital domain, the OFDM FFT operation may be performed on the digital signals to transform the digital signals in time domain into subcarrier signals in frequency domain.

After the FFT operation, the digital beamforming operation is performed in frequency domain. The digital beamforming may be represented as follows:

$$\tilde{y}_{B\times 1}^{(k)} = W_{B\times T}^{(k)} \times y_{T\times 1}^{(k)},$$

where B represents the number of spatial beams, T represents the number of the antennas, k represents the subcarrier index. $\tilde{y}_{B\times 1}^{(k)}$ and $y_{T\times 1}^{(k)}$, represent vectors on the $k^{th}$ subcarrier in beam domain and antenna domain, respectively. $W_{B\times T}^{(k)}$ represents beamforming weight on the $k^{th}$ subcarrier, which may be derived from DFT (Discrete Fourier Transform). In FIG. 5, the signal of each antenna would be involved in the signal in each beam.

With the digital beamforming, the signals in antenna space can achieve better SNR. The reason is, when the number of the antennas increases, the receiving SNR on each receiver branch will decrease. To increase the SNR, the received signals will be transformed into beam-space, e.g., by applying DFT operation in the spatial domain.

Figure 6:
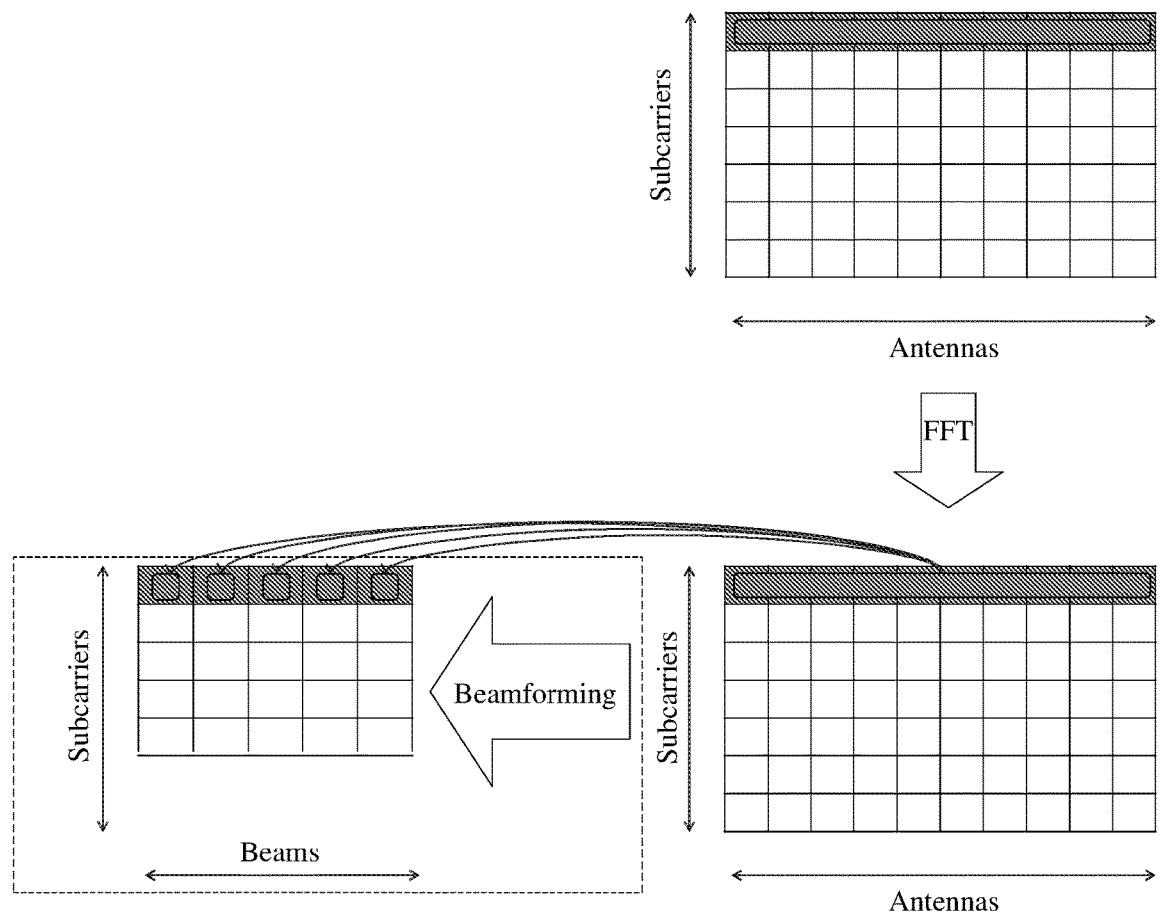
FIG. 6 is an illustration of FFT and beamforming without DC offset in the receiver as shown in FIG. 5.

FIG. 6 shows a process of ideal FFT and beamforming without DC offset, taking a view from two-dimensions of frequency/antenna and frequency/beam perspectives. The signals in time domain may be transformed into the signals in frequency domain through the FFT operation. Then in frequency domain, the signals in the antennas may be combined into the signals in the beams through the digital beamforming.

Figure 3:
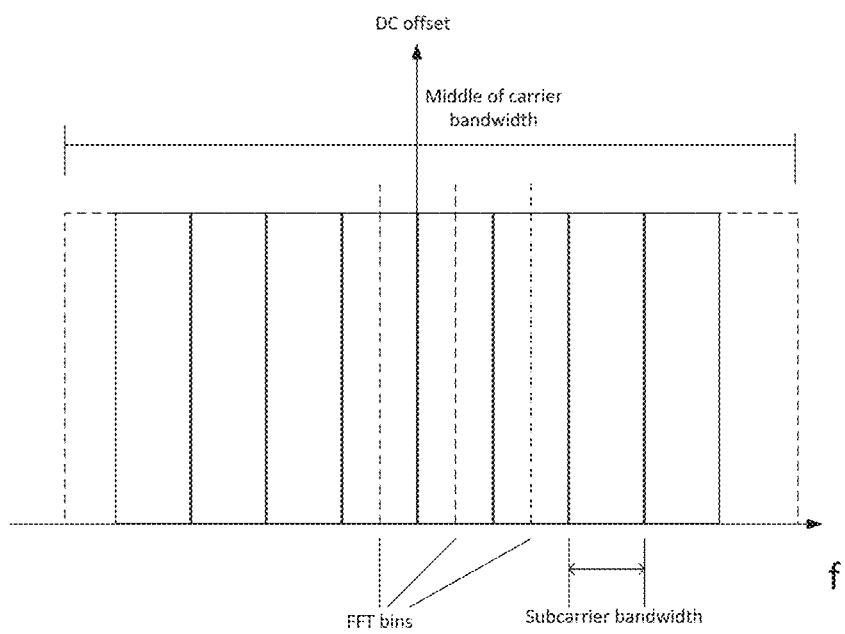
FIG. 3 is a diagram illustrating the DC offset position in frequency relative to carrier bandwidth.
Figure 4:
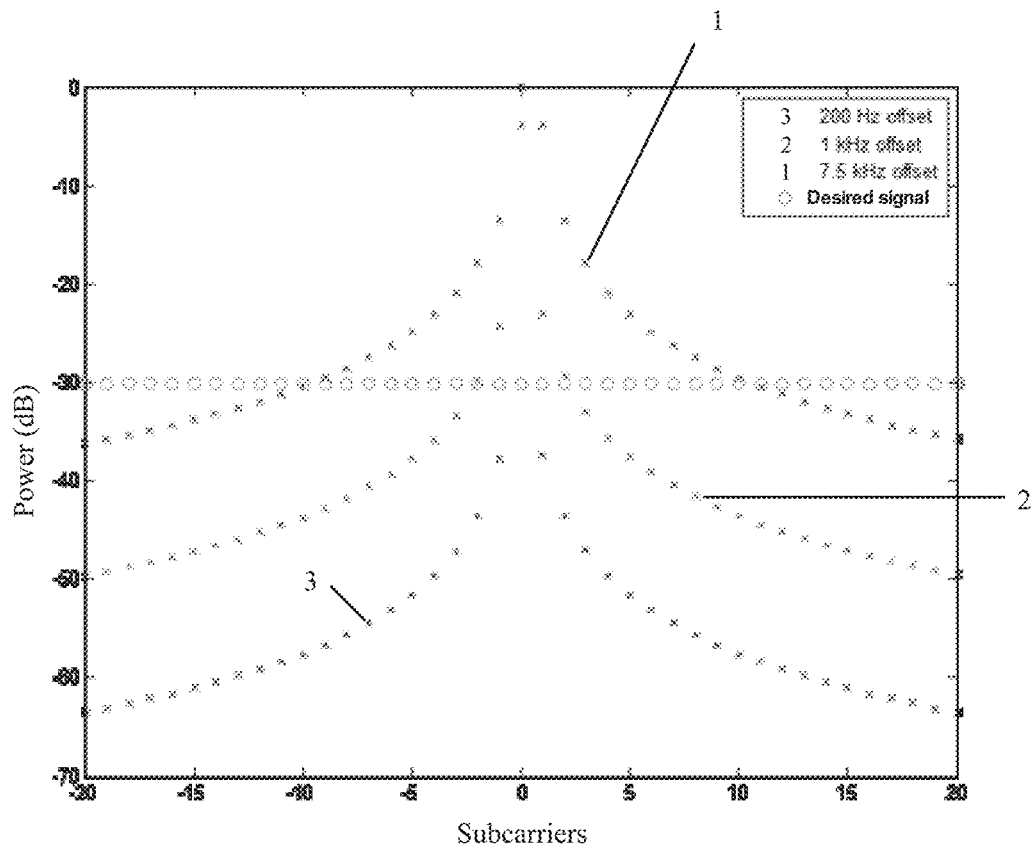
FIG. 4 is a diagram illustrating an example of the DC offset.
Figure 7:
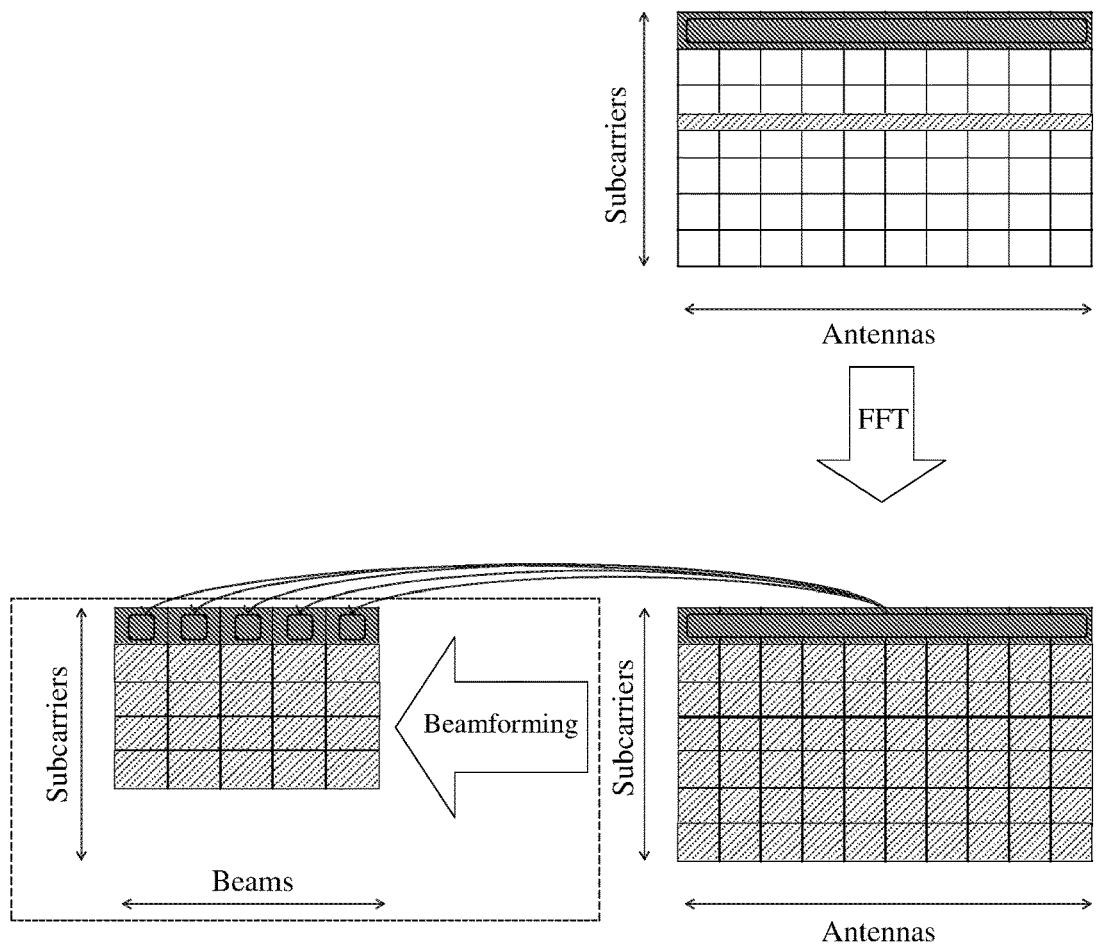
FIG. 7 is an illustration of FFT and beamforming with DC offset in the receiver as shown in FIG. 5.

Due to the zero-IF receiver in each receiver branch, the DC offset may be generated in each receiver branch, as shown in FIG. 3. FIG. 7 shows the process of the FFT and beamforming in the case of the DC offsets. As shown in FIG. 7, the DC offsets of all the receiver branches are positioned at the middle of two subcarriers. The DC offsets may be distributed among all the FFT bins after the FFT operation. Thus after beamforming, all the formed beams are polluted.

In the present disclosure, a method, apparatus and computer program product are provided to mitigate the impact of the DC offset. Though embodiments of the present disclosure can be implemented in the exemplary massive MIMO system shown in FIG. 5, it would be appreciated that embodiments of the disclosure are not limited to such a system. With embodiments of the present disclosure, the impact of the DC offset can be mitigated, and no extra processing will be introduced in the massive MIMO system.

Figure 8:
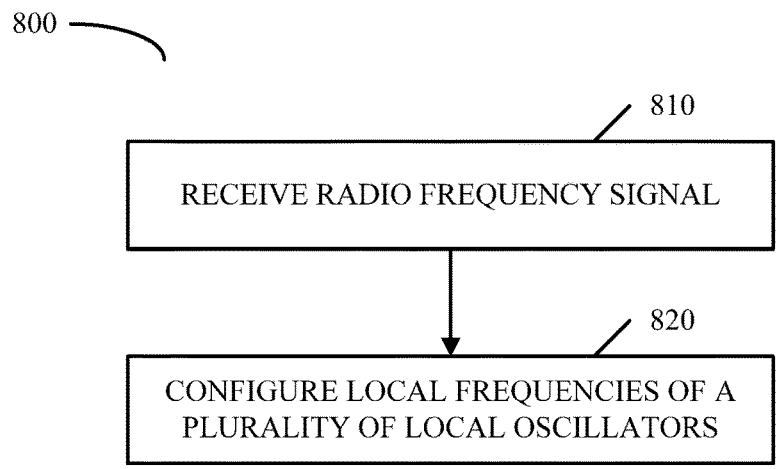
FIG. 8 is a flowchart illustrating a method for DC offset degradation according to some embodiments of the present disclosure.

Reference is now made to FIG. 8, which shows a flowchart of a method 800 according to an embodiment of the present disclosure. The method 800 may be implemented in a massive MIMO system, for example, as shown in FIG. 5. The massive MIMO system may be an active antenna system. The massive MIMO system may comprise a plurality of receiver branches.

As shown in FIG. 8, at block 810, each of the plurality of receiver branches may receive a RF signal. As is known, the RF signal may be obtained by modulating a BF signal on a carrier with a certain carrier frequency. The RF signal may be received by an antenna of each receiver branch. Then at block 820, different local frequencies of a plurality of local oscillators may be configured respectively according to a carrier frequency of the RF signal, to enable the DC offsets generated in the plurality of receiver branches to be distinguishable from each other in frequency. As described above, if the local oscillator provides the local oscillation signal with the same frequency as the carrier frequency of the RF signal, the RF signal may be down converted into the BF signal directly by mixing with the local oscillation signal. Thus the DC offset would be generated for the BF signal. The DC offset may be generated in each of the receiver branch, and positioned at the center of the carrier. In order to mitigate the impact of the DC offsets, it is desirable to separate the DC offsets generated in the receiver branches in frequency. To this end, the local oscillators of the receiver branches should be configured differently from the carrier frequency of the RF signal. With such the local oscillator configuration, the generated DC offsets will be distributed in a small range relative to bandwidth of the carrier.

Figure 9:
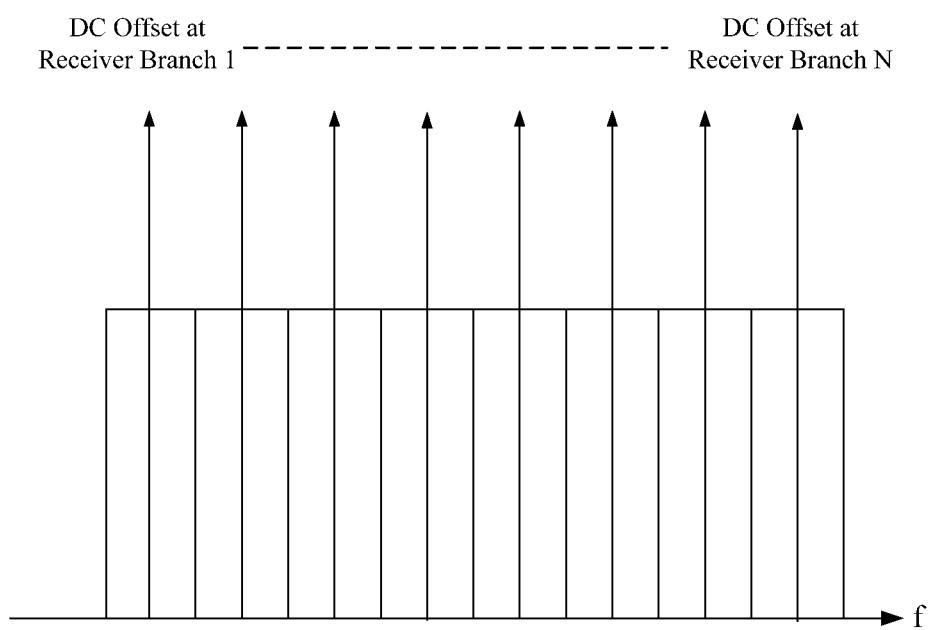
FIG. 9 is an illustration of DC offset distribution with the method as shown in FIG. 8.

In some embodiments, the different local frequencies of the local oscillators may be configured such that the DC offsets are positioned respectively at a center of different subcarriers of the carrier. In an embodiment, the different local frequencies of the local oscillators may be configured to be different from the carrier frequency by (N+0.5) multiple of a subcarrier spacing, wherein N is a natural number. Generally in LTE network, the subcarrier spacing may be 15 kHz. In NR system, the subcarrier spacing may be 15 kHz, 30 kHz, 60 kHz, or 120 kHz. In an example, assume the carrier frequency is 2 GHz and the subcarrier spacing is 15 kHz. Then the local oscillators may be configured to have the respective local frequencies of $(2*10^6+0.5*15)$ kHz, $(2*10^6+(1+0.5)*15)$ kHz, ..., and $(2*10^6+(N+0.5)*15)$ kHz, where N represents the number of the receiver branches. With such the local oscillator configuration, the DC offsets will be positioned at 7.5 kHz, 22.5 kHz, ..., and $(N+0.5)*15$ kHz, and the distribution range of the DC offsets will be $N*15$ kHz. FIG. 9 illustrates the DC offset distribution. In FIG. 9, the DC offsets generated in the receiver branches are positioned individually in the centers of the different subcarriers.

Figure 10:
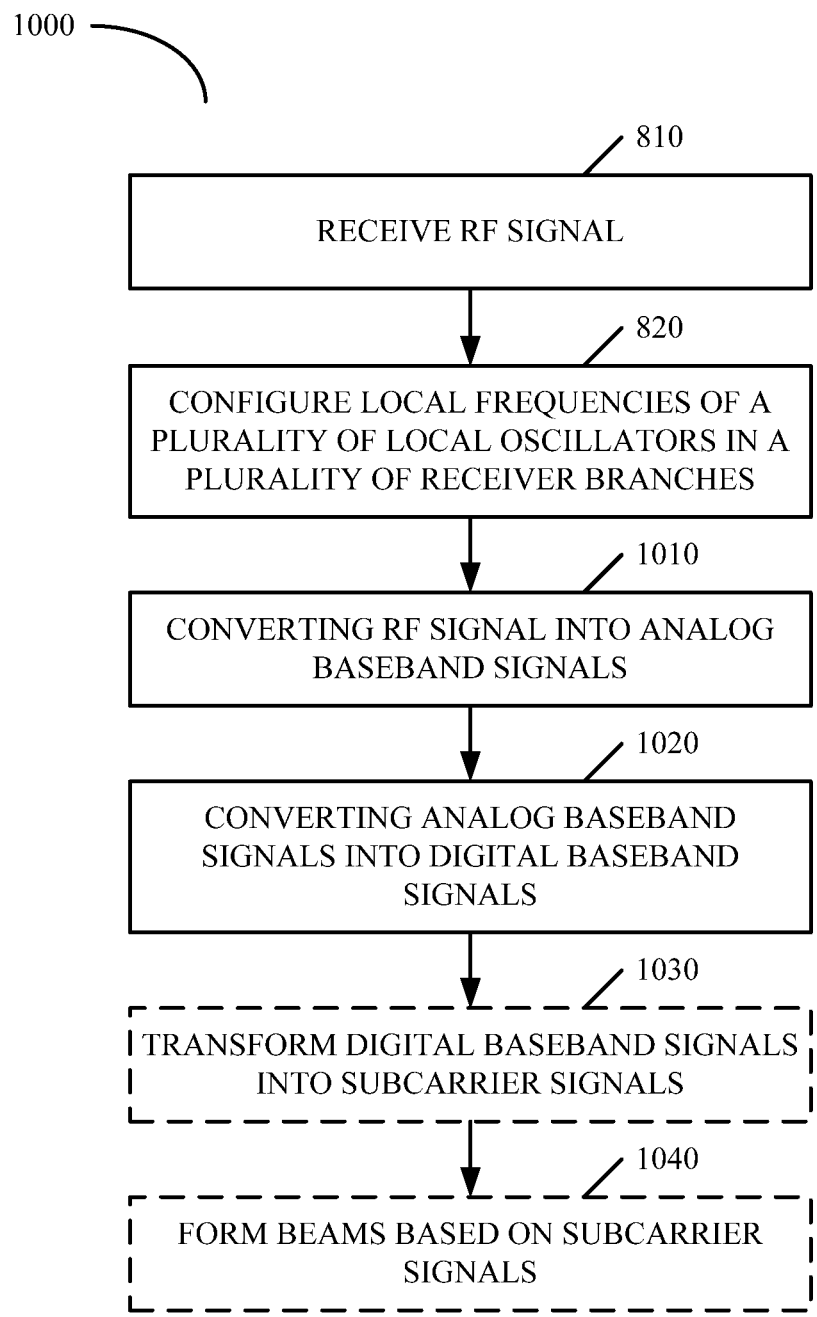
FIG. 10 is a flowchart illustrating a method for DC offset degradation according to some embodiments of the present disclosure.

FIG. 10 is a flowchart illustrating a method 1000 for DC offset degradation according to another embodiment of the present disclosure. In FIG. 10, at block 1010, each receiver branch may convert the received RF signal into an analog baseband signal by means of the corresponding local oscillator. This conversion may be performed by a mixer of the receiver branch. The mixer may mix the received RF signal with the local oscillation signal from the corresponding local oscillator to generate the analog baseband signal. As the local oscillators generate the local oscillation signals with the different local frequencies, the central frequencies of the analog baseband signals in the receiver branches are different. Accordingly these analog baseband signals will be shifted from each other in frequency by a difference between the local frequencies. In an embodiment, the difference may be the subcarrier spacing. In above example, the central frequencies of the analog baseband signals are 7.5 kHz, 22.5 kHz, ..., and (N+0.5)*15 kHz, and the analog baseband signals are shifted from each other by 15 kHz. At this time, the DC offsets in the receiver branches are positioned at 0 Hz.

Then at block 1020, each receiver branch may convert the analog baseband signal into a digital baseband signal, such that the digital baseband signals are aligned with each other in frequency. In an embodiment, this conversion may be performed by an analog-to-digital (A/D) converter and a digital mixer of each receiver branch. The A/D converter may perform the A/D conversion on the analog baseband signal. Then in digital domain, the digital mixer may mix the converted baseband signal with a digital oscillation signal to generate the resulting digital baseband signal with the central frequency of 0 Hz. Therefore the frequency of the digital oscillation signal should be equal to a frequency difference between the local frequency of the corresponding local oscillator and the carrier frequency. In the above example, the frequencies of the digital oscillation signals will be 7.5 kHz, 22.5 kHz, . . . , and (N+0.5)*15 kHz. In an embodiment, the digital oscillation signal may be generated by a numerically controlled oscillator (NCO). Through the operation of block 1020, the DC offsets can be separated and positioned at 7.5 kHz, 22.5 kHz, . . . , and (N+0.5)*15 kHz, respectively.

Figure 11:
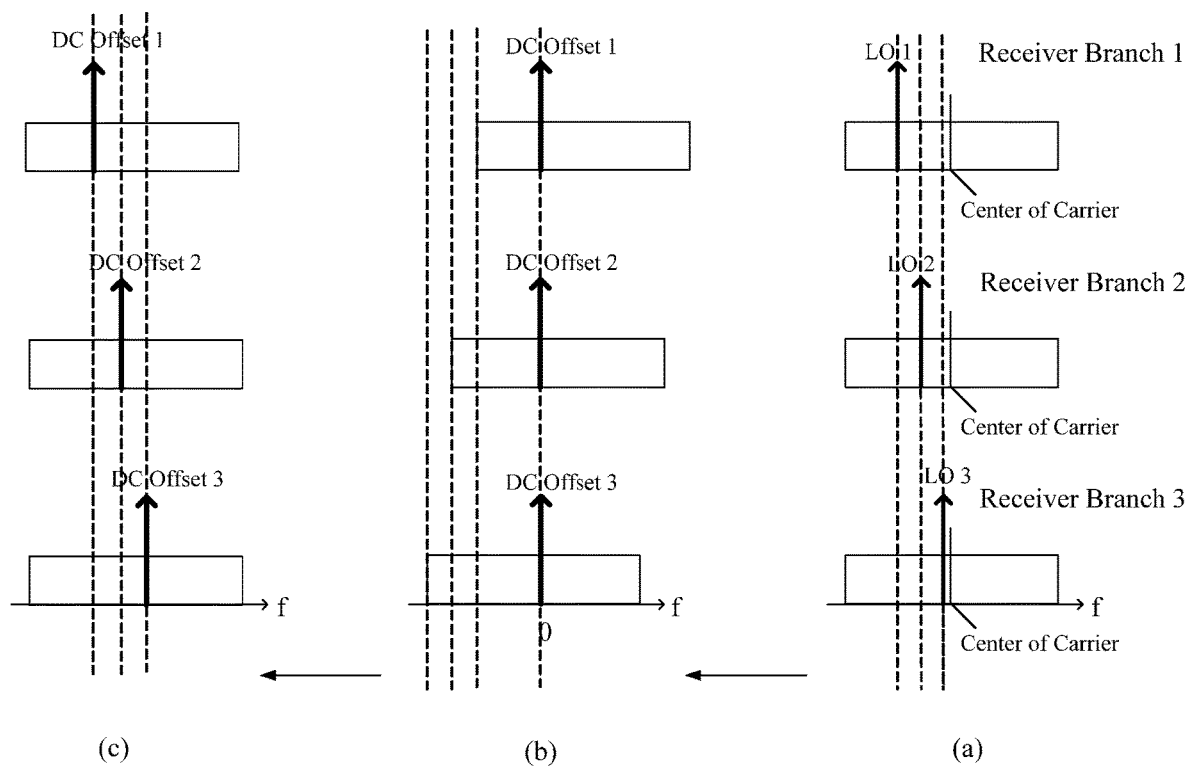
FIG. 11 is a diagram illustrating the DC offset distribution during the method as shown in FIG. 10.

FIG. 11 illustrates the DC offset distribution during the method as shown in FIG. 10. In FIG. 11, three receiver branches 1, 2, 3 are shown. Each of the receiver branches receives the same RF signal. In FIG. 11(*a*), symbol "↑" indicates the local frequency of the local oscillation signal. At this time, no DC offset is generated. As shown, the local frequencies have different offsets from the center of the carrier which carries the RF signal. After the down conversion by the local oscillators, the RF signal is converted into the analog BF signal, and the DC offset is generated in each receiver branches, labeled as "DC offset 1", "DC offset 2", and "DC offset 3" in FIG. 11(*b*). The DC offsets 1, 2, and 3 are positioned at 0 Hz. The BF signals are shifted from each other by the same offset as that between the local frequencies. After the A/D conversion and the digital conversion by the NCOs, the analog BF signals are converted into the digital BF signals, and the digital BF signals are aligned with each other, as shown in FIG. 11(*c*). At this time, the DC offsets 1, 2, and 3 are positioned separately and shifted from each other by the same offset as that between the local frequencies.

Figure 12:
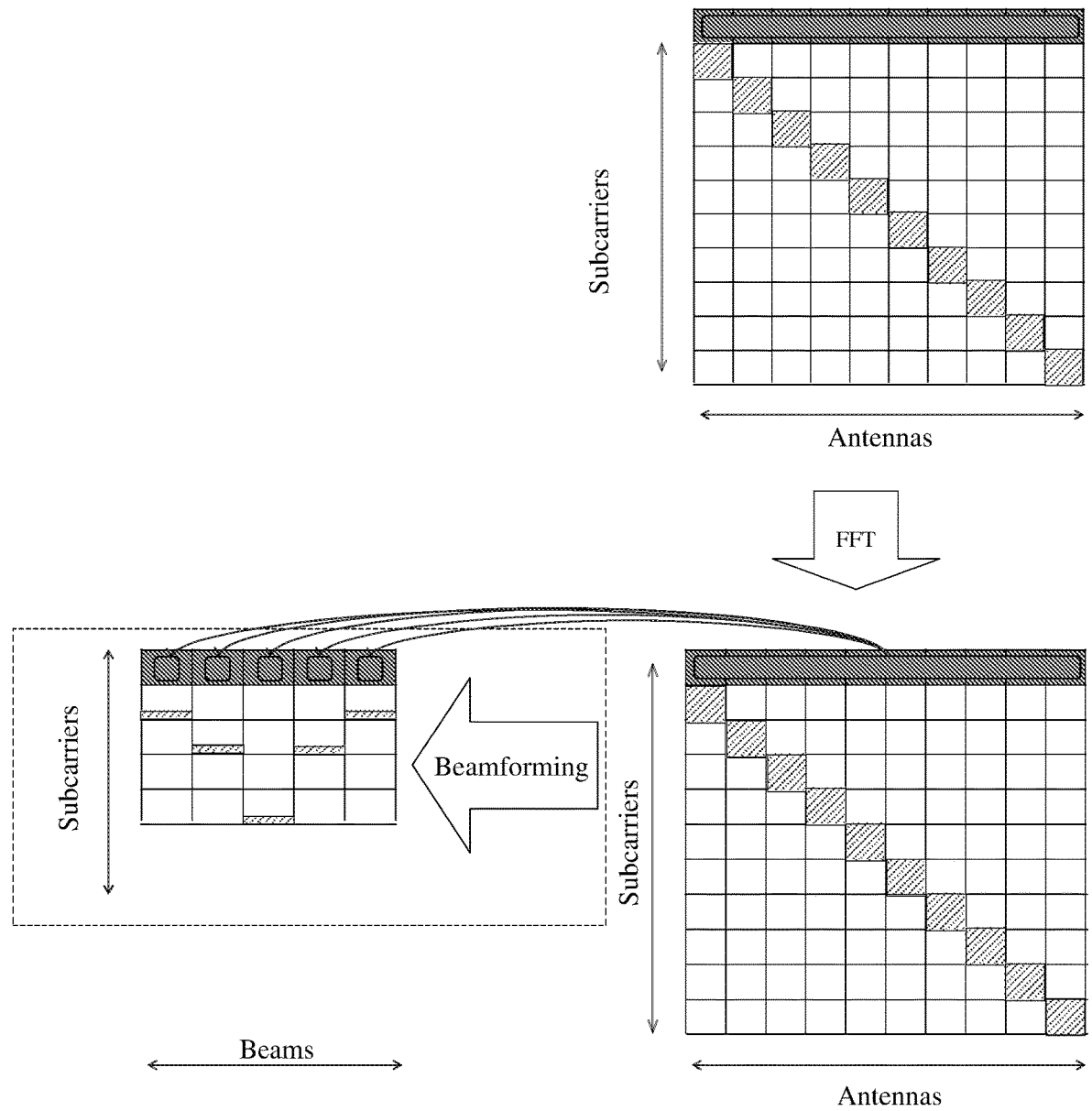
FIG. 12 is an illustration of FFT and beamforming with the DC offset degradation.
Figure 13:
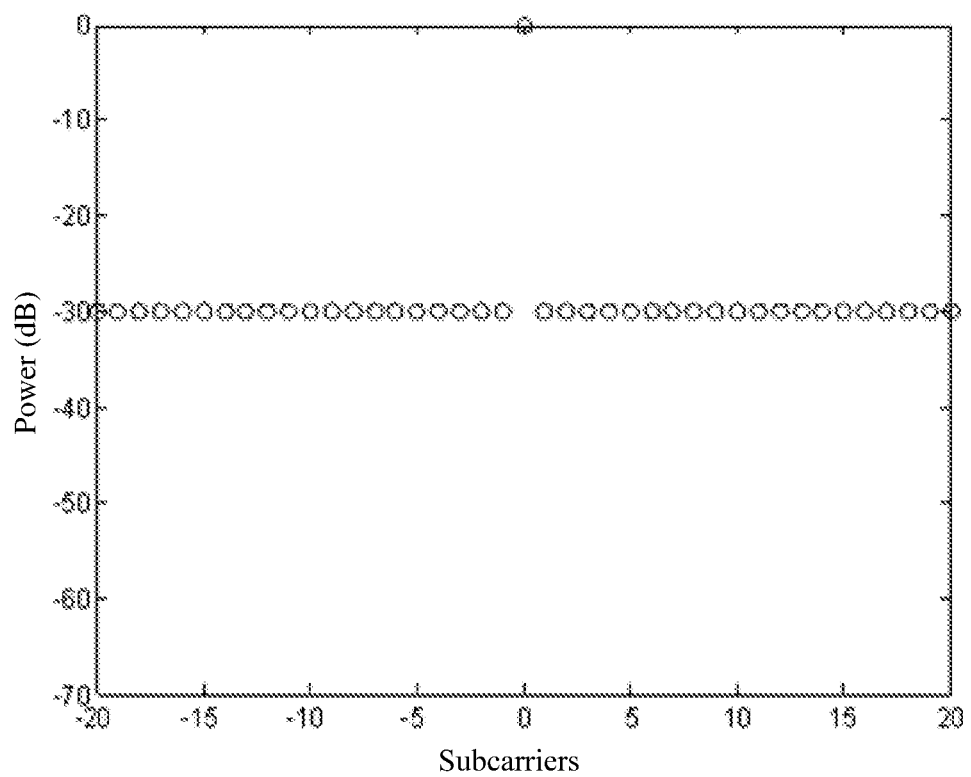
FIG. 13 is a diagram illustrating an example of the DC offset with the DC offset degradation.

Referring back to FIG. 10, at block 1030, the digital baseband signals may be transformed from time domain into subcarrier signals in frequency domain. Such the transformation may be implemented by the FFT operation. Then at block 1040, a plurality of beams signals may be generated based on the subcarrier signals. A person skilled in the art will appreciate that any beamforming algorithm may be used. As the DC offsets are distributed at the centers of different subcarriers, after beamforming, the impact of the DC offset to each beam will be reduced at 1/N level (wherein N represents the number of the receiver branches). FIG. 12 shows the process of the FFT and beamforming with the DC offset degradation. It can be seen in FIG. 12 that the DC offset only impacts one subcarrier for one antenna, and the impact to the beams is decreased greatly. FIG. 13 shows an example of the DC offset after implementing the method as shown in FIG. 10. In FIG. 13, the DC offset only impacts one subcarrier.

Figure 14:
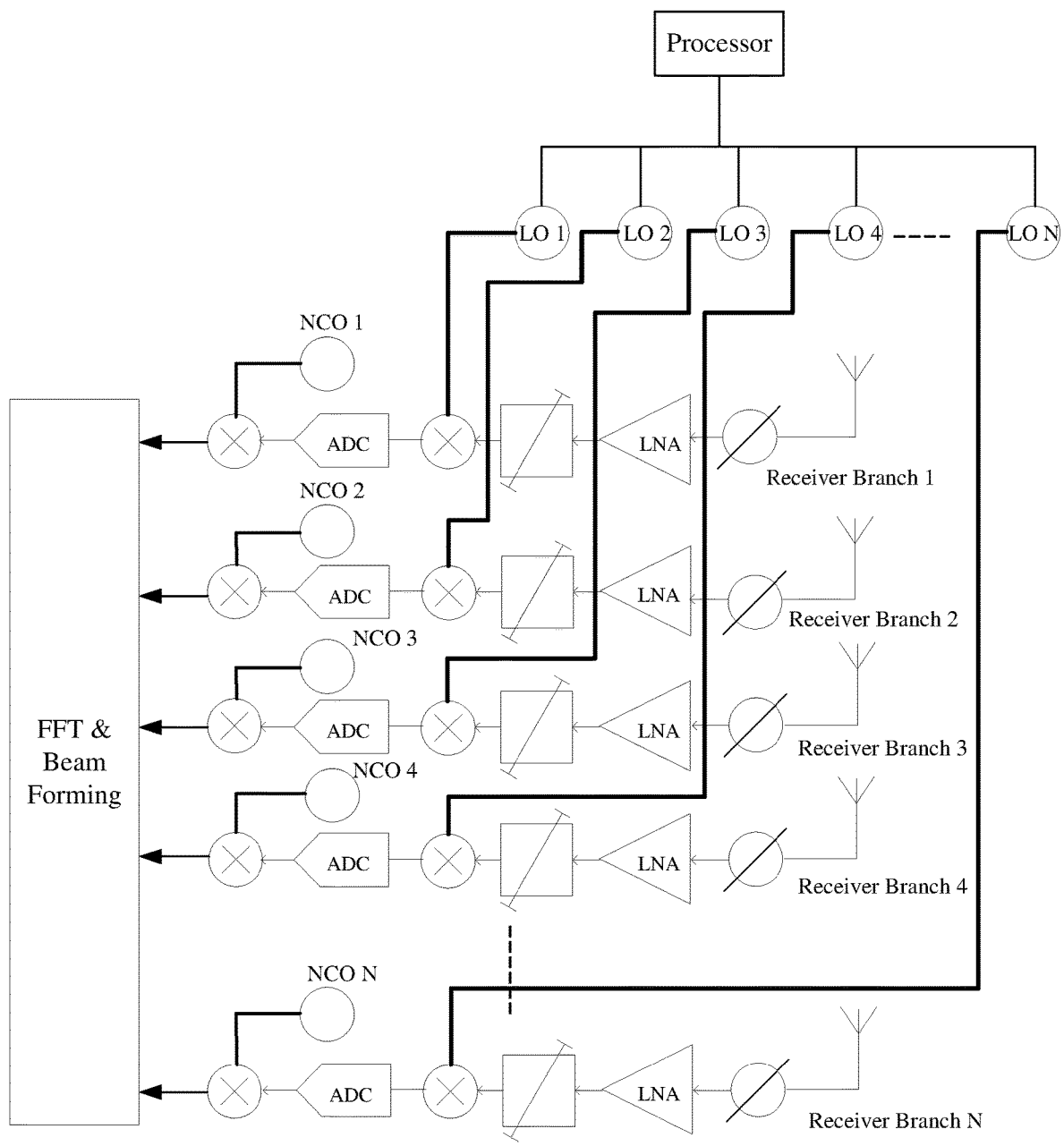
FIG. 14 is an exemplary structural diagram of the massive MIMO system in which the method as shown in FIG. 9 is implemented.

FIG. 14 illustrates an exemplary structural diagram of the massive MIMO system. As shown in FIG. 14, the massive MIMO system may comprise a plurality of N receiver branches. Each of the receiver branches may comprise an antenna, a first RF filter, a low noise amplifier, a second RF filter, a mixer, an A/D converter (ADC), and a digital mixer. The massive MIMO system may also comprise a processor, a plurality of N local oscillators and a plurality of N NCOs. The processor may be configured to configure different local frequencies of N local oscillators respectively according to a carrier frequency of the RF signal received by the antennas, to enable the DC offsets in the N receiver branches to be distinguishable from each other in frequency. In some embodiments, the processor may be configured to configure the different local frequencies of the N local oscillators such that the DC offsets are positioned respectively at a center of different subcarriers of the carrier carrying the RF signal. In an embodiment, the processor may be configured to configure the different local frequencies of the plurality of local oscillators to be different from the carrier frequency by (N+0.5) multiple of a subcarrier spacing, wherein N is a natural number.

In FIG. 14, the mixer (also referred to as "first converter") may convert the received RF signal into an analog baseband signal by means of the corresponding local oscillator. The analog baseband signals will shift from each other in frequency by a difference between the local frequencies of the corresponding local oscillators. The ADC may perform the AD conversion on the analog baseband signal, and the digital mixer may mix the converted baseband signal with the digital oscillation signal from the corresponding NCO. The digital oscillation signal has a frequency that is equal to a frequency difference between the local frequency of the corresponding local oscillator and the carrier frequency. The ADC and the digital mixer may constitute the second converter.

The massive MIMO system may further comprise a FFT transformer configured to transform the digital baseband signals in time domain into subcarrier signals in frequency domain by means of FFT, and a beamformer configured to form a plurality of beam signals based on the subcarrier signals.

Figure 15A:
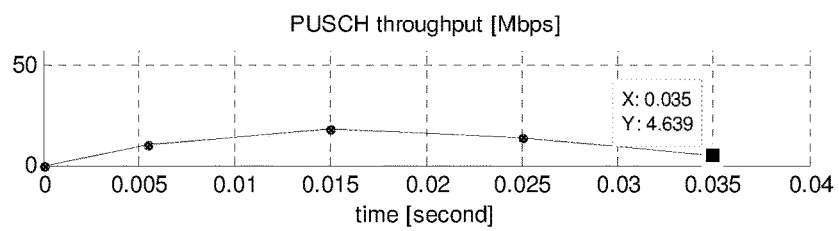
FIGS. 15A, 15B are simulation diagrams of PUSCH throughput without the DC offset degradation and with the DC offset degradation, respectively.
Figure 15B:
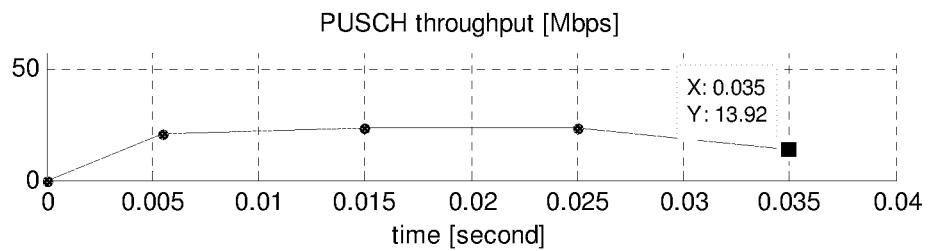

FIGS. 15A and 15B shows the simulation diagram of PUSCH (Physical Uplink Shared CHannel) throughput without the DC offset degradation and with the DC offset degradation, respectively. It can be seen that the PUSCH throughput can be greatly increased with the method for DC offset degradation according to the embodiments of the present disclosure.

Figure 16:
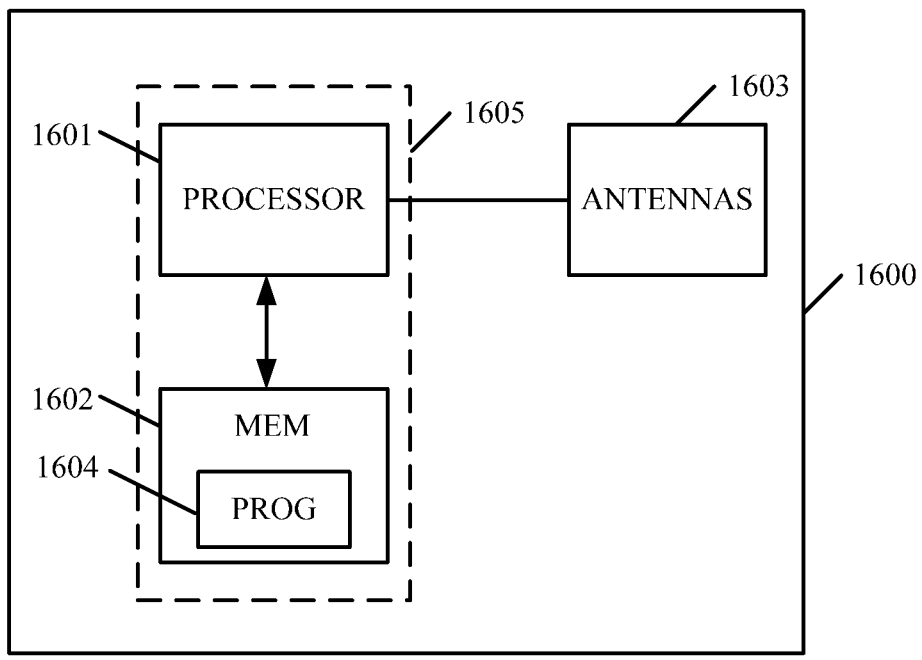
FIG. 16 is a schematic block diagram of an apparatus for DC offset degradation according to some embodiments of the present disclosure.

FIG. 16 illustrates a simplified block diagram of an apparatus 1600 that may be embodied in the massive MIMO system. The apparatus 1600 may comprise at least one processor 1601, such as a data processor (DP) and at least one memory (MEM) 1602 coupled to the processor 1601. The apparatus 1601 may further comprise a plurality of antennas 1603 coupled to the processor 1601. The MEM 1602 stores a program (PROG) 1604. The PROG 1604 may include instructions that, when executed on the associated processor 1601, enable the apparatus 1600 to operate in accordance with the embodiments of the present disclosure, for example to perform the method 800 or 1000. A combination of the at least one processor 1601 and the at least one MEM 1602 may form processing means 1605 adapted to implement various embodiments of the present disclosure.

Various embodiments of the present disclosure may be implemented by computer program executable by one or more of the processor 1601, software, firmware, hardware or in a combination thereof.

The MEM 1602 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 1601 may be of any type suitable to the local technical environment, and may include one or more of general purpose computers, special purpose computers, microprocessors, digital signal processors DSPs and processors based on multicore processor architecture, as non-limiting examples.

Figure 17:
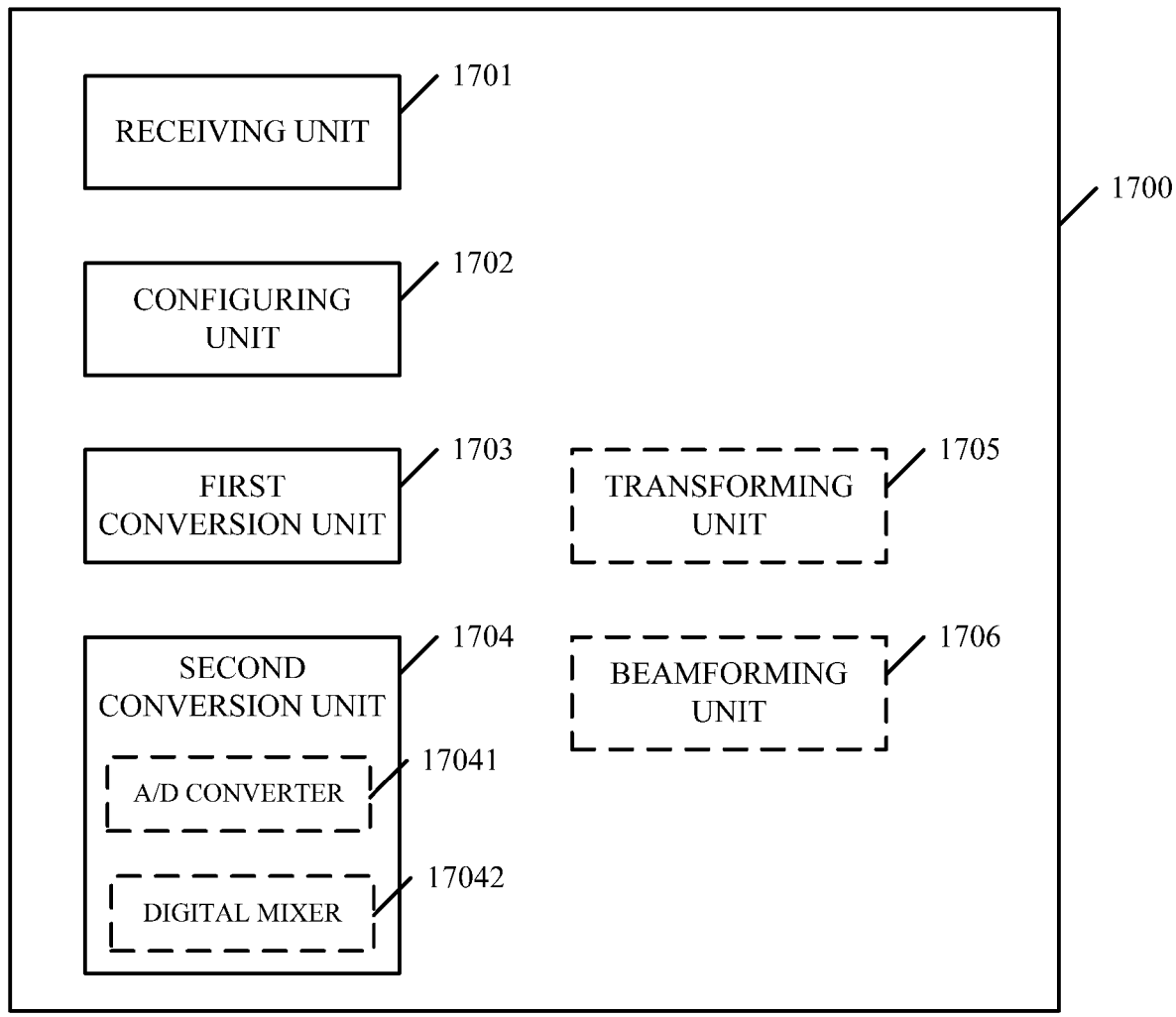
FIG. 17 is a schematic block diagram of an apparatus for DC offset degradation according to some embodiments of the present disclosure.

FIG. 17 illustrates a schematic structure of an apparatus 1700 in the massive MIMO system according to some embodiments of the present disclosure. As shown in FIG. 17, the apparatus 1700 may comprise a receiving unit 1701 configured to receiving a RF signal in the plurality of receive branches, and a configuring unit 1702 configured to configuring different local frequencies of a plurality of local oscillators respectively in the plurality of receiver branches according to a carrier frequency of the RF signal, to enable DC offsets in the plurality of receiver branches to be distinguishable from each other in frequency.

In some embodiments, the configuring unit 1702 may be configured to configure the different local frequencies of the plurality of local oscillators such that the DC offsets are positioned respectively at a center of different subcarriers of a carrier carrying the RF signal. In an embodiment, the configuring unit 1702 may be configured to configure the different local frequencies of the plurality of local oscillators to be different from the carrier frequency by (N+0.5) multiple of a subcarrier spacing, wherein N is a natural number.

In some embodiments, the apparatus 1700 may further comprise a first conversion unit 1703 configured to convert the RF signal into an analog baseband signal by means of the corresponding local oscillator, such that the analog baseband signals in the plurality of receiver branches shift from each other in frequency by a difference between the local frequencies of the corresponding local oscillators; and a second conversion unit 1704 configured to convert the analog baseband signal into a digital baseband signal, such that the digital baseband signals are aligned with each other in frequency.

In some embodiments, the second conversion unit 1704 may comprise an analog-to-digital converter 17041 configured to perform an analog-to-digital conversion on the analog baseband signal; and a digital mixer 17042 configured to mix the converted baseband signal with a digital oscillation signal, wherein the digital oscillation signal has a frequency that is equal to a frequency difference between the local frequency of the local oscillator in the receiver branch and the carrier frequency.

In some embodiments, the apparatus 1700 may further comprise a transforming unit 1705 configured to transform the digital baseband signals in time domain into subcarrier signals in frequency domain by means of FFT; and a beamforming unit 1706 configured to form a plurality of beam signals based on the subcarrier signals.

Although some embodiments are described in the context of the LTE network, it should not be construed as limiting the spirit and scope of the present disclosure. The principle and concept of the present disclosure may be more generally applicable to other network architectures.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented in a massive multi-input multi-output ("MIMO") system, the massive MIMO system comprising a plurality of receiver branches, the method comprising:

receiving a radio frequency ("RF") signal in the plurality of receiver branches; and configuring different local frequencies of a plurality of local oscillators respectively in the plurality of receiver branches based on a carrier frequency of the RF signal to enable direct current ("DC") offsets in the plurality of receiver branches to be distinguishable from each other in frequency, wherein the different local frequencies of the plurality of local oscillators are:

configured such that the DC offsets are positioned respectively at a center of different subcarriers of a carrier carrying the RF signal; and configured to be different from the carrier frequency by (N+0.5) multiple of a subcarrier spacing, wherein N is a natural number.

2. The method of claim 1, further comprising:

converting, in each of the receiver branches, the RF signal into an analog baseband signal using the corresponding local oscillator, such that the analog baseband signals in the plurality of receiver branches shift from each other in frequency by a difference between the local frequencies of the corresponding local oscillators; and converting, in each of the receiver branches, the analog baseband signal into a digital baseband signal such that the digital baseband signals are aligned with each other in frequency.

3. The method of claim 2, wherein converting, in each of the receiver branches, the analog baseband signal into a digital baseband signal comprises:

performing an analog-to-digital conversion on the analog baseband signal; and mixing the converted baseband signal with a digital oscillation signal, wherein the digital oscillation signal has a frequency that is equal to a frequency difference between the local frequency of the local oscillator in the receiver branch and the carrier frequency.

4. The method of claim 2, further comprising:

transforming the digital baseband signals in time domain into subcarrier signals in frequency domain using Fast Fourier Transform ("FFT"); and forming a plurality of beam signals based on the subcarrier signals.

5. The method of claim 1, wherein each local oscillator of the plurality of local oscillators is located in one of the plurality of receiver branches.

6. The method of claim 1, wherein each receiver branch of the plurality of receiver branches comprises a zero-intermediate frequency ("IF") receiver.

7. An apparatus in a massive MIMO system, the massive MIMO system comprising a plurality of receiver branches, the apparatus comprising:

a processor; and a memory having instructions stored therein that are executable by the processor to cause the apparatus to perform operations comprising:

receiving a radio frequency ("RF") signal in the plurality of receiver branches; and configuring different local frequencies of a plurality of local oscillators respectively in the plurality of receiver branches according to a carrier frequency of the RF signal to enable direct current ("DC") offsets in the plurality of receiver branches to be distinguishable from each other in frequency, wherein configuring the different local frequencies of the plurality of local oscillators comprises:

configuring the different local frequencies such that the DC offsets are positioned respectively at a center of different subcarriers of a carrier carrying the RF signal; and configuring the different local frequencies to be different from the carrier frequency by (N+0.5) multiple of a subcarrier spacing, wherein N is a natural number.

8. The apparatus of claim 7, the operations further comprising:

converting, in each of the receiver branches, the RF signal into an analog baseband signal using the corresponding local oscillator such that the analog baseband signals in the plurality of receiver branches shift from each other in frequency by a difference between the local frequencies of the corresponding local oscillators; and converting, in each of the receiver branches, the analog baseband signal into a digital baseband signal such that the digital baseband signals are aligned with each other in frequency.

9. The apparatus of claim 8, the operations further comprising:

performing, in each of the receiver branches, an analog-to-digital conversion on the analog baseband signal; and mixing, in each of the receiver branches, the converted baseband signal with a digital oscillation signal, wherein the digital oscillation signal has a frequency that is equal to a frequency difference between the local frequency of the local oscillator in the receiver branch and the carrier frequency.

10. The apparatus of claim 7, the operations further comprising:

transforming the digital baseband signals in time domain into subcarrier signals in frequency domain using a Fast Fourier Transform ("FFT"); and forming a plurality of beam signals based on the subcarrier signals.

11. The apparatus of claim 7, wherein each local oscillator of the plurality of local oscillators is located in one of the plurality of receiver branches.

12. The apparatus of claim 7, wherein each receiver branch of the plurality of receiver branches comprises a zero-intermediate frequency ("IF") receiver.

13. A massive multi-input multi-output ("MIMO") system comprising:

a plurality of receiver branches, each of which comprises an antenna configured to receive a radio frequency ("RF") signal; and a processor; and a memory coupled to the processor and having instructions stored therein that are executable by the processor to cause the MIMO system to perform operations comprising:

configuring different local frequencies of a plurality of local oscillators respectively in the plurality of receiver branches according to a carrier frequency of the RF signal to enable direct current ("DC") offsets in the plurality of receiver branches to be distinguishable from each other in frequency, wherein configuring the different local frequencies of the plurality of local oscillators comprises:

configuring the different local frequencies such that the DC offsets are positioned respectively at a center of different subcarriers of a carrier carrying the RF signal; and configuring the different local frequencies to be different from the carrier frequency by (N+0.5) multiple of a subcarrier spacing, wherein N is a natural number.

14. The massive MIMO system of claim 13 wherein each of the plurality of receiver branch further comprises:
   a first converter configured to convert the RF signal into an analog baseband signal using the corresponding local oscillator such that the analog baseband signals in the plurality of receiver branches shift from each other in frequency by a difference between the local frequencies of the corresponding local oscillators; and
   a second converter configured to convert the analog baseband signal into a digital baseband signal such that the digital baseband signals are aligned with each other in frequency.

15. The massive MIMO system of claim 14, wherein the second converter comprises:
   an analog-to-digital converter configured to perform an analog-to-digital conversion on the analog baseband signal; and
   a digital mixer configured to mix the converted baseband signal with a digital oscillation signal,
   wherein the digital oscillation signal has a frequency that is equal to a frequency difference between the local frequency of the local oscillator in the receiver branch and the carrier frequency.

16. The massive MIMO system of claim 14, further comprising:
   a Fast Fourier Transform ("FFT") transformer configured to transform the digital baseband signals in time domain into subcarrier signals in frequency domain using the FFT; and
   a beamformer configured to form a plurality of beam signals based on the subcarrier signals.

17. The MIMO system of claim 13, further comprising:
   the plurality of local oscillators, each of which located in one of the plurality of receiver branches.

18. The MIMO system of claim 13, wherein each receiver branch of the plurality of receiver branches comprises a zero-intermediate frequency ("IF") receiver.

* * * * *